(12) United States Patent
Slocum et al.

(10) Patent No.: US 11,866,196 B1
(45) Date of Patent: Jan. 9, 2024

(54) PAYLOAD DEPLOYMENT FROM AEROSTATS

(71) Applicant: LTAG SYSTEMS LLC, Bow, NH (US)

(72) Inventors: Alexander H. Slocum, Bow, NH (US); Jonathan T. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 0 days.

(21) Appl. No.: 17/832,318

(22) Filed: Jun. 3, 2022

Related U.S. Application Data

(60) Provisional application No. 63/196,644, filed on Jun. 3, 2021.

(51) Int. Cl.
| | |
|---|---|
| *B64D 5/00* | (2006.01) |
| *B64C 39/02* | (2023.01) |
| *B64B 1/50* | (2006.01) |
| *B64U 10/13* | (2023.01) |
| *B64U 10/25* | (2023.01) |
| *B64U 10/30* | (2023.01) |
| *B64U 50/34* | (2023.01) |
| *B64U 70/20* | (2023.01) |

(52) U.S. Cl.
CPC .................. *B64D 5/00* (2013.01); *B64B 1/50* (2013.01); *B64C 39/024* (2013.01); *B64U 10/13* (2023.01); *B64U 10/25* (2023.01); *B64U 10/30* (2023.01); *B64U 50/34* (2023.01); *B64U 70/20* (2023.01)

(58) Field of Classification Search
CPC ............ B64C 39/024; B64C 2201/021; B64C 2201/022; B64C 2201/027; B64C 2201/066; B64C 2201/082; B64D 5/00; B64B 1/50; E05F 1/1016; E05F 3/08; E05F 3/06; B64U 10/13; B64U 10/25; B64U 10/30; B64U 50/34; B64U 70/20
See application file for complete search history.

(56) References Cited

U.S. PATENT DOCUMENTS

| | | | | |
|---|---|---|---|---|
| 1,925,945 | A | * | 9/1933 | Zielinski ............... E05F 1/1016 267/155 |
| 2,742,662 | A | * | 4/1956 | Lyons ................... E05F 1/1016 267/155 |

(Continued)

FOREIGN PATENT DOCUMENTS

GB        2356184 A        5/2001

OTHER PUBLICATIONS

USPTO; U.S. Appl. No. 16/804,676, Non-Final Office Action dated Jul. 21, 2021; 17 pages.

(Continued)

*Primary Examiner* — Medhat Badawi
(74) *Attorney, Agent, or Firm* — The Marbury Law Group, PLLC

(57) ABSTRACT

According to one aspect, a system for midair deployment of payload may include an aerostat including an inflatable structure, at least one tether, and a trigger, the at least one tether extending between the inflatable structure and the trigger, and at least one unmanned aerial vehicle (UAV) including wings, the at least one tether mechanically coupling the at least one UAV to the inflatable structure, and the trigger actuatable to release mechanical coupling of the at least one tether between the at least one UAV and the inflatable structure in midair.

17 Claims, 12 Drawing Sheets

(56) References Cited

U.S. PATENT DOCUMENTS

| | | | | |
|---|---|---|---|---|
| 3,381,655 A | * | 5/1968 | Rozzelle | F16K 15/20 116/210 |
| 4,239,277 A | * | 12/1980 | Oda | B60R 7/06 180/90 |
| 4,586,456 A | * | 5/1986 | Forward | B64B 1/40 244/33 |
| 5,240,449 A | * | 8/1993 | Sloan | A63H 27/10 446/473 |
| 5,301,631 A | * | 4/1994 | Vining | G08B 5/002 116/210 |
| 5,555,839 A | * | 9/1996 | Staten | B64B 1/64 116/210 |
| 5,605,481 A | * | 2/1997 | Van Raden | B63B 22/18 441/25 |
| 5,732,752 A | * | 3/1998 | Glessner | B63C 9/24 141/330 |
| 6,386,137 B1 | * | 5/2002 | Riche | B64B 1/40 441/89 |
| 6,648,272 B1 | * | 11/2003 | Kothmann | B64B 1/58 244/30 |
| 7,344,267 B2 | * | 3/2008 | Carito | A63H 27/10 362/205 |
| 7,503,277 B2 | * | 3/2009 | Boschma, Jr | G09F 21/06 116/210 |
| 7,588,087 B2 | * | 9/2009 | Cafferata | A62C 3/0235 169/53 |
| 8,157,205 B2 | * | 4/2012 | McWhirk | B64B 1/02 244/30 |
| 8,430,704 B2 | * | 4/2013 | Jeffrey | A44B 15/005 441/16 |
| 9,174,140 B2 | * | 11/2015 | Nelson | A63H 27/10 |
| 9,346,532 B1 | * | 5/2016 | Ratner | B64B 1/62 |
| 9,545,542 B2 | * | 1/2017 | Binder | H02J 50/10 |
| 9,619,977 B2 | * | 4/2017 | Graham | G01S 1/02 |
| 9,853,360 B2 | * | 12/2017 | Sylvia | B63C 11/26 |
| 10,113,534 B2 | * | 10/2018 | Sia | F03D 5/00 |
| 10,556,709 B1 | * | 2/2020 | Kimchi | B64U 80/84 |
| 10,737,754 B1 | * | 8/2020 | Farley | B64B 1/58 |
| 10,745,789 B2 | | 8/2020 | Slocum | |
| 10,787,268 B2 | * | 9/2020 | Leidich | B64D 17/025 |
| 10,829,192 B1 | * | 11/2020 | Farley | B64B 1/62 |
| 10,829,229 B2 | * | 11/2020 | MacCallum | B64D 17/64 |
| 10,988,227 B2 | * | 4/2021 | MacCallum | B64B 1/62 |
| 11,047,162 B1 | * | 6/2021 | Tennessee | E05F 1/1016 |
| 11,141,671 B2 | * | 10/2021 | Harter | A63H 27/10 |
| 11,142,318 B2 | * | 10/2021 | Thrun | B64D 5/00 |
| 11,203,430 B2 | * | 12/2021 | Heppe | B64B 1/64 |
| 11,312,466 B1 | * | 4/2022 | Slocum | B64B 1/62 |
| 2003/0062444 A1 | * | 4/2003 | Goodey | B64B 1/62 244/24 |
| 2004/0016613 A1 | * | 1/2004 | Uemura | E05F 1/1215 188/313 |
| 2006/0278757 A1 | * | 12/2006 | Kelleher | B64C 39/024 244/63 |
| 2008/0121778 A1 | * | 5/2008 | Imajou | B60N 2/305 248/590 |
| 2010/0038477 A1 | * | 2/2010 | Kutzmann | B64D 3/00 242/400 |
| 2010/0112396 A1 | * | 5/2010 | Goldstein | C25B 1/55 977/773 |
| 2010/0230121 A1 | * | 9/2010 | Hall | B64D 1/16 169/53 |
| 2010/0276537 A1 | * | 11/2010 | Kutzmann | B64D 5/00 244/1 TD |
| 2013/0115544 A1 | * | 5/2013 | Davidson | H02K 7/1807 290/1 A |
| 2013/0219795 A1 | * | 8/2013 | Fukumoto | F16F 1/12 49/386 |
| 2014/0021288 A1 | | 1/2014 | Elson et al. | |
| 2014/0075847 A1 | * | 3/2014 | Konchan | E05B 81/90 49/394 |
| 2014/0097289 A1 | * | 4/2014 | Heppe | B64C 37/02 244/2 |
| 2014/0231132 A1 | * | 8/2014 | Watanabe | H02G 3/22 174/650 |
| 2016/0207605 A1 | * | 7/2016 | Jensen | B64B 1/40 |
| 2016/0257415 A1 | * | 9/2016 | Ye | B64D 3/00 |
| 2016/0355918 A1 | * | 12/2016 | Slocum | C23C 2/14 |
| 2017/0355460 A1 | * | 12/2017 | Shannon | B64U 70/30 |
| 2018/0237141 A1 | | 8/2018 | Heppe | |
| 2018/0272898 A1 | * | 9/2018 | Wojatzki | B60N 2/06 |
| 2018/0274272 A1 | * | 9/2018 | Woo | E05B 77/46 |
| 2019/0077510 A1 | * | 3/2019 | Panas | B64B 1/62 |
| 2019/0185162 A1 | * | 6/2019 | Prager | B64D 1/08 |
| 2019/0226247 A1 | * | 7/2019 | Johann | E05B 81/21 |
| 2019/0341637 A1 | * | 11/2019 | Fine | H01M 8/04089 |
| 2020/0095074 A1 | * | 3/2020 | Byers | B64D 1/22 |
| 2020/0130833 A1 | * | 4/2020 | Miller | B64B 1/50 |
| 2020/0156790 A1 | * | 5/2020 | von Flotow | B64F 1/222 |
| 2020/0199728 A1 | * | 6/2020 | Slocum | C23C 2/02 |
| 2020/0262536 A1 | * | 8/2020 | Deakin | B64B 1/20 |
| 2020/0361631 A1 | | 11/2020 | Leone et al. | |
| 2021/0011492 A1 | * | 1/2021 | Raabe | B64D 1/22 |
| 2023/0150701 A1 | * | 5/2023 | Yartha | B64U 30/10 244/17.23 |

OTHER PUBLICATIONS

USPTO; U.S. Appl. No. 16/804,676, Notice of Allowance dated Jan. 25, 2022; 25 pages.
USPTO; U.S. Appl. No. 17/014,593, Notice of Allowance dated Jan. 22, 2021; 19 pages.
USPTO; U.S. Appl. No. 17/014,593, Notice of Allowance dated Jun. 3, 2021; 15 pages.
USPTO; U.S. Appl. No. 17/014,593, Restriction Requirement dated Dec. 8, 2020; 7 pages.
USPTO; U.S. Appl. No. 17/475,320, Notice of Allowance of 063/09/2022; 24 pages.
Wikipedia, "USS Macon (ZRS-5)", 10 pages, (Feb. 24, 2023).
McMaster-Carr, Connectors, "Connecting Chain Links for Chain Barriers", 1 page, (Oct. 21, 2021).
McMaster-Carr, Springs, "Torsion Springs", 3 pages, (Oct. 24, 2021).
The United States Patent and Trademark Office, "Non-Final Office Action," issued in related U.S. Appl. No. 18/113,968 dated Jun. 15, 2023 (18 pages).

\* cited by examiner

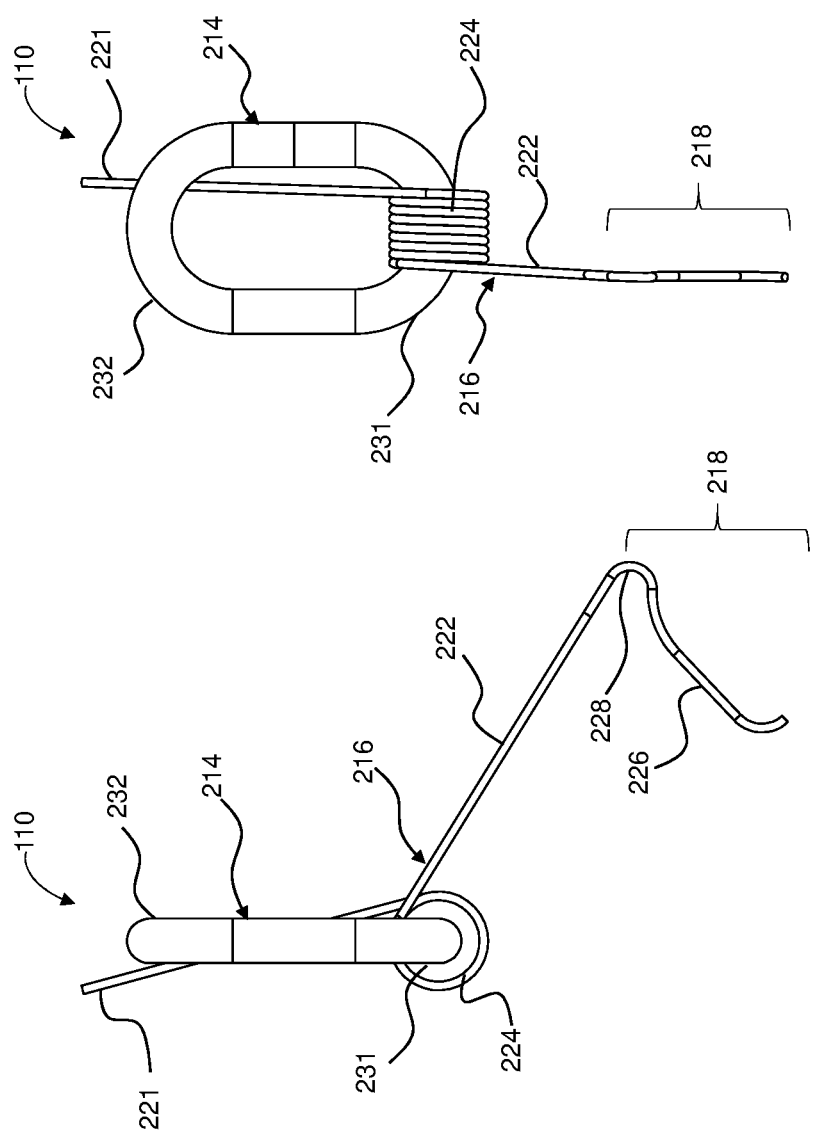

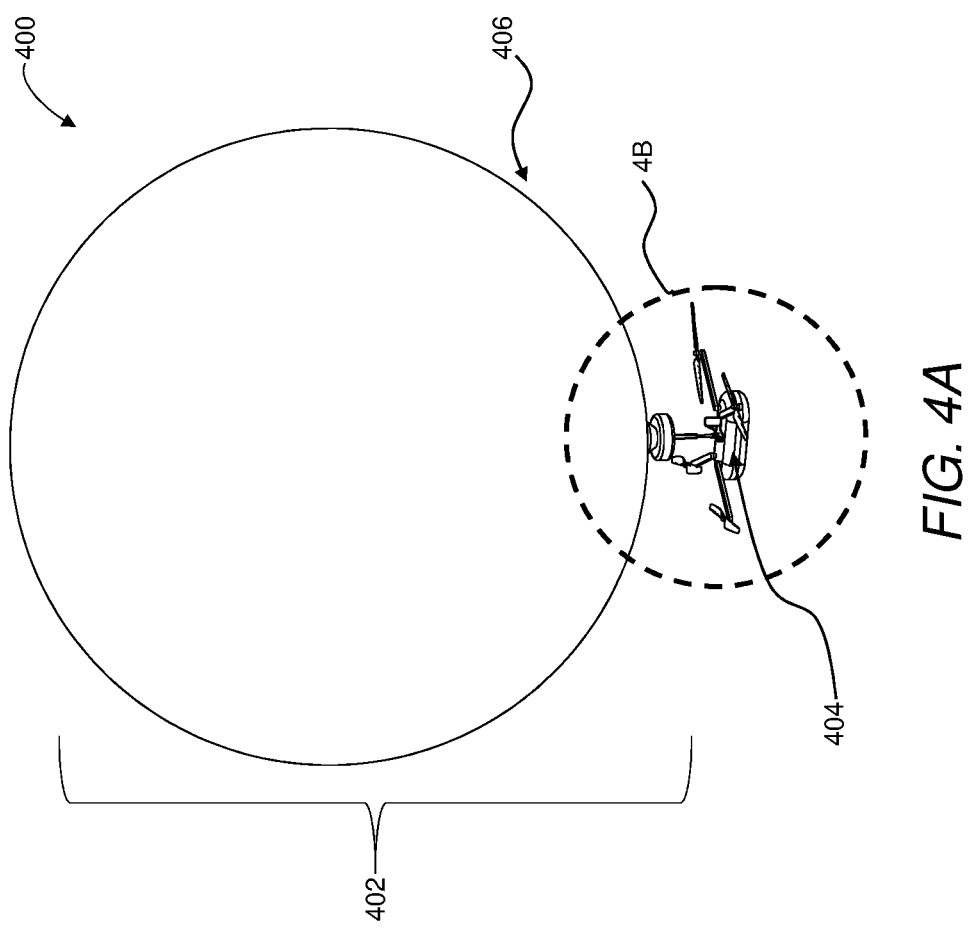

PAYLOAD DEPLOYMENT FROM AEROSTATS

CROSS-REFERENCE TO RELATED APPLICATIONS

This application claims priority to U.S. Provisional Application 63/196,644, filed Jun. 3, 2021, the entire contents of which are hereby incorporated herein by reference.

BACKGROUND

Unmanned aerial vehicles (UAVs), also known as drones, are used across a range of missions that are too dangerous, too long, and/or otherwise impractical or impossible to be carried out using manned flight. These missions span both military and commercial uses. Some examples of missions carried out by UAVs include surveillance, reconnaissance, combat, communication, weather observation, and delivery.

Many UAVs are battery-powered, with the battery of a given UAV sized to allow the UAV to carry out an intended type of mission. However, a large fraction of the battery capacity of a given UAV is required to lift the UAV (including any mission-related payload) to altitude. This limits the types and form factors of UAVs that may be suitable for a given class of mission.

There remains a need for lifting UAVs to altitude while making more efficient use of battery capacity of these UAVs such that, among other things, the range of UAVs may be extended, the payload capacity of UAVs may be increased, and/or UAVs may be made to smaller and lighter.

SUMMARY

According to one aspect, an aerostat for midair deployment of payload may include an inflatable structure, a tether coupled to the inflatable structure, and a trigger including a linkage, a spring, and a hook, the linkage coupled to the inflatable structure via the tether, the spring having a first section and a second section, the linkage restricting movement of the first section of the spring, the second section of the spring resiliently flexible relative to the first section of the spring, and the hook disposed along the second section of the spring.

In certain implementations, the second section of the spring may be biased toward the first section of the spring, and the second section is movable toward the first section as a load is removed from the hook.

In some implementations, the hook may include a wire having a cross-sectional area dimensioned to support a tensile load corresponding to stress in the wire being less than half of a yield strength of the wire.

In some implementations, the spring may be a torsion spring, the first section of the spring is a first leg of the torsion spring, the second section of the spring is a second leg of the torsion spring, and the torsion spring includes one or more coils between the first leg and the second leg. For example, the second leg may be movable from a nonparallel position relative to the first leg to a substantially parallel position relative to the first leg in response to placement of an external load of at least 5 lbs. on the hook. Additionally, or alternatively, the linkage may include a first portion and a second portion, the first portion spaced apart from the second portion, the one or more coils of the torsion spring are wrapped about the first portion of the linkage, and the second portion of the linkage is between the first leg and the second leg such that the first leg rests against the second portion of the linkage when a load on the hook moves the second leg away from the first leg.

In certain implementations, the linkage may be formed of one or more polymeric materials.

In some implementations, the aerostat may additionally, or alternatively, include a drain valve mechanically coupled to the inflatable structure, wherein the drain valve is mechanically coupled to the tether, the inflatable structure further includes a balloon and a neck, the balloon at least partially defines a volume, the neck defines a passage in fluid communication with the volume and, with a payload supported on the hook of the trigger to pull the tether taut, the drain valve is actuatable to release condensed moisture from the volume via the passage.

According to another aspect, a system for midair deployment of payload may include an aerostat including an inflatable structure, at least one tether, and a trigger, the at least one tether extending between the inflatable structure and the trigger, and at least one unmanned aerial vehicle (UAV) including wings, the at least one tether mechanically coupling the at least one UAV to the inflatable structure, and the trigger actuatable to release mechanical coupling of the at least one tether between the at least one UAV and the inflatable structure in midair.

In certain implementations, the aerostat may additionally, or alternatively, include a drain valve coupled to the inflatable structure, the drain valve is mechanically coupled to the at least one tether, the inflatable structure includes a balloon and a neck, the balloon at least partially defines a volume, the neck defines a passage in fluid communication with the volume and, with the at least one UAV mechanically coupled to the at least one tether to pull the at least one tether taut, the drain valve is actuatable to release condensed moisture from the volume via the passage.

In some implementations, the trigger may be actuatable in response to an increase of a first lift of the at least one UAV relative to a second lift of the aerostat while the aerostat is in flight. For example, the trigger may include a spring movable away from the at least one unmanned aerial vehicle in response to a reduction in an external load on the spring as the first lift of the at least one UAV increases relative to the second lift of the aerostat while the aerostat is in flight.

In some implementations, the trigger may include an actuator and a power source in electrical communication with one another, the actuator electrically actuatable by the power source to release the at least one UAV from the inflatable structure in midair. For example, the actuator may include a solenoid electrically actuatable by the power source to release the at least one UAV from the inflatable structure in midair. Additionally, or alternatively, the actuator may include a heater electrically actuatable by the power source to heat the at least one tether to yield under load of the at least one UAV to release the at least one UAV from the inflatable structure in midair. Further, or instead, the system may include an altimeter and a controller, wherein the altimeter and the actuator are each in electrical communication with the controller, and the controller is configured to receive, from the altimeter, a first signal indicative of altitude of the inflatable structure, compare the first signal indicative of altitude to a predetermined threshold parameter, and based on comparison of the first signal to the predetermined threshold parameter, send a second signal to the actuator to release the at least one UAV from the inflatable structure. The predetermined threshold parameter may, for example, include a change in altitude indicative of neutral buoyancy of the inflatable structure attached to the at least one UAV. Additionally, or alternatively, the predetermined threshold parameter may include an altitude of the inflatable structure.

In certain implementations, the at least one UAV may include a plurality of UAVs mechanically coupled to the inflatable structure via the at least one tether, and the trigger is actuatable to release each UAV of the plurality of UAVs independently of one another. As an example, the at least one tether may extend between the plurality of UAVs to couple the plurality of UAVs to one another and to the inflatable structure. Further, or instead, the at least one tether may extend between the plurality of UAVS and the inflatable structure such that the plurality of UAVs are arranged in series in a direction extending below and away from the inflatable structure while the inflatable structure is midair.

In certain implementations, the at least one UAV may include a fixed-wing aircraft, a rotary-wing aircraft, or both.

In some implementations, the system may additionally, or alternatively, include a communication payload coupled to the inflatable structure, the communication payload operable for communication with the at least one UAV following release of the at least one UAV from the inflatable structure.

BRIEF DESCRIPTION OF THE FIGURES

FIG. 2A is a side view of a trigger of the aerostat of FIG. 1A.

FIG. 2B is a front view of the trigger of FIG. 2A.

FIG. 2C is a perspective view of the trigger of FIG. 2C.

FIG. 4A is a schematic representation of a system for midair deployment of payload, the system including a trigger including a heating element.

Like reference symbols in the various drawings indicate like elements.

DETAILED DESCRIPTION

Figure 1A:
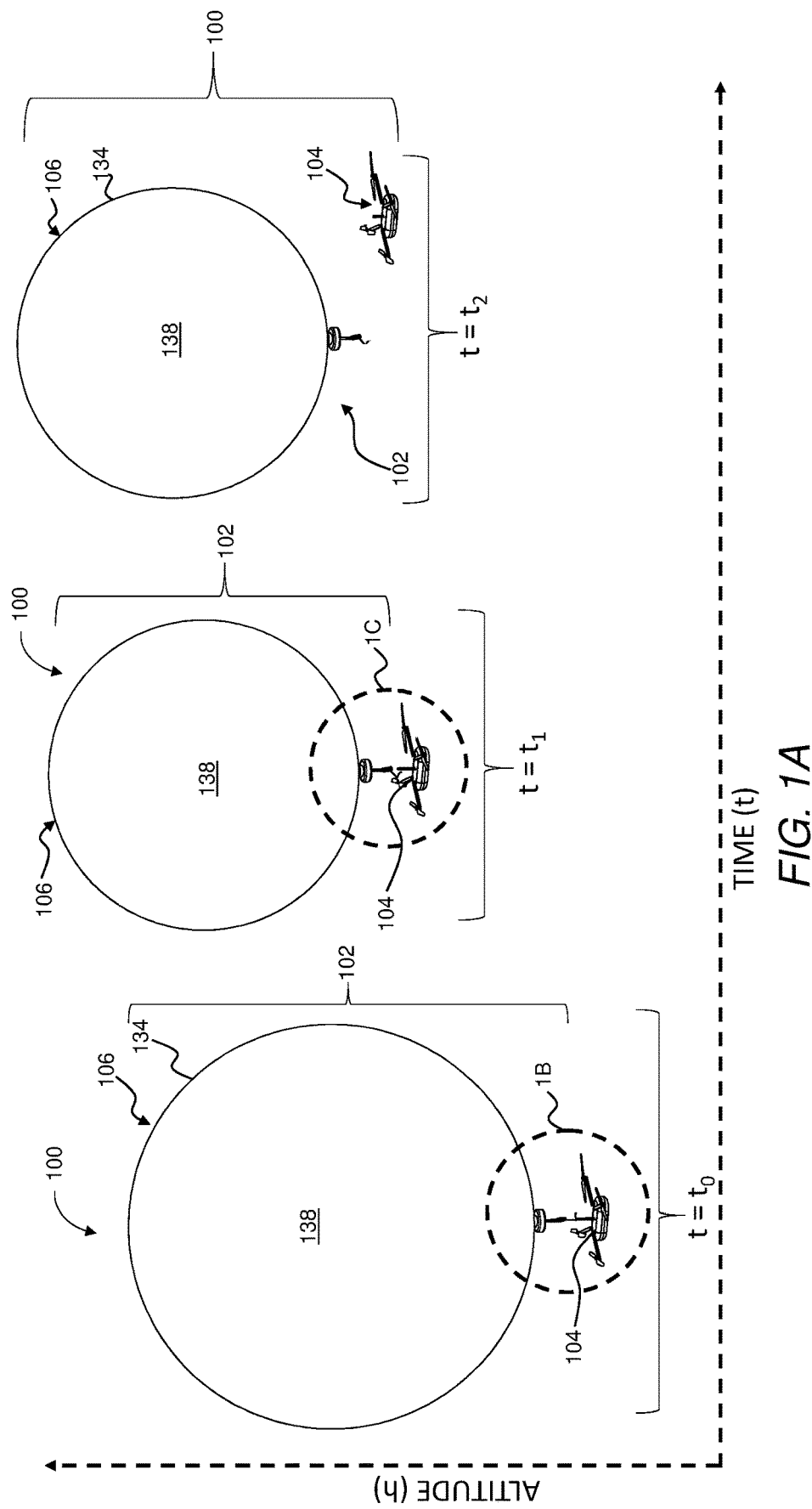
FIG. 1A is a schematic representation of a temporal sequence of operation of a system for midair deployment of payload, the system includes an aerostat and an unmanned aerial vehicle (UAV), and the system is shown at an initial time step ($t=t_0$) in which the UAV is mechanically coupled to the aerostat, at a first time step ($t=t_1$) in which the UAV is initially released from the aerostat, and at a second time step ($t=t_2$) in which the UAV has flown a distance away from the aerostat.

Embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the description that follows, devices, systems, and methods for payload deployment from aerostats are generally described. As used herein, the term "aerostat" shall be understood to include any one or more of various different types of lighter-than-air aircraft that gain lift primarily from aerostatic lift, in contrast to aerodynes that primarily make use of aerodynamic lift requiring movement of a wing surface through air. In use cases described herein, an aerostat may contain a quantity of lifting gas such that the average density of the aerostat (containing the quantity of lifting gas) is less than or equal to the density of air at some altitude and, thus, the aerostat is at least neutrally buoyant in air for a period of time. Unmanned and unpowered aerostats are an important application for lifting gas and serve as useful examples for highlighting particular aspects of the devices, systems, and methods of the present disclosure. However, unless otherwise specified or made clear from the context, the term "aerostat" shall be understood to include any manner and form of object that can receive lifting gas to have at least some degree of buoyancy in air, whether in an indoor or an outdoor environment. Accordingly, as used herein, an aerostat may include any one or more of various different manned or unmanned craft, dirigible or non-dirigible craft, independently propelled or floating craft, rigid or nonrigid craft, tethered or untethered craft, or combinations thereof.

In the description that follows, devices, systems, and methods are described as deploying unmanned aerial vehicles (UAVs) in midair. It shall be appreciated that—in addition to being important in a variety of commercial and military applications—midair deployment of UAVs is an implementation that is amenable to the clear and efficient description of various aspects of midair deployment of payloads from aerostats more generally. Unless otherwise specified or made clear from the context, however, it shall be understood that aerostats described herein may additionally, or alternatively, be used for midair deployment of any one or more of various types of payloads, without departing from the scope of the present disclosure. Thus, as an example, aerostats described herein may additionally, or alternatively, be used for midair deployment of supplies or goods intended for delivery to the ground (e.g., in areas that are remote or otherwise difficult to reach, in hostile territory, etc.).

As used herein, the term "unmanned aerial vehicle" (sometimes abbreviated herein as "UAV") shall be understood to refer to any one or more of various different types of aerodynes that achieve flight primarily through the use of aerodynamic lift requiring movement of a wing surface through air, as distinguished from aerostats relying on aerostatic lift to achieve flight. Thus, unless otherwise specified or made clear from the context, a UAV may include fixed-wing aircraft, rotary-wing aircraft, or both. Additionally, unless otherwise specified, a UAV may include an aerodyne with or without its own propulsion source, with the latter category referred to as a "glider." Further, unless a contrary intent is indicated, it shall be generally understood that UAVs described herein may each carry any one or more of various payloads. Such payloads carried by the UAVs may, however, be mission-specific and quite varied. Thus, for the sake of clear and efficient description, UAVs described herein shall be understood to be inclusive of aircraft loaded with any associated payloads.

As used herein, the term "gas" or variants thereof (e.g., lifting gas) shall be understood to include a single component or multiple components (mixed), unless otherwise specified or made clear from the context. Further, unless a contrary intent is indicated, the use of the term gas shall be generally understood to include any multi-phase mixture that includes one or more gas phase components and exhibits characteristics of a compressible fluid, with a relationship between pressure, volume, and temperature that is accurately characterized by the ideal gas law to within about ±5 percent at room temperature at sea level. Thus, for example, a gas may include at least one gas phase component, as well as some amount of one or more vapor components (e.g., water vapor). Additionally, or alternatively, unless a contrary intent is explicitly indicated, a gas may be a mixture gaseous products (including hydrogen and steam) formed through reaction of activated aluminum and water, as described in U.S. Pat. No. 10,745,789, issued to Jonathan Thurston Slocum on Aug. 18, 2020, and entitled "Activated Aluminum Fuel," the entire contents of which are hereby incorporated herein by reference.

As used herein, the term "mechanically coupled" or variants thereof (e.g., mechanically coupling) shall be understood to include both direct and indirect mechanical coupling of elements to one another, unless otherwise specified or made clear from the context. Thus, to avoid unnecessary repetition in the description that follows, elements described as being mechanically coupled to one another shall be generally understood to include arrangements in which such elements are directly connected to one another, as well as arrangements in which such elements are indirectly indirect connected to one another through one or more intermediate elements.

Further, for the sake of clear and efficient description, elements with numbers having the same last two digits in the disclosure that follows shall be understood to be analogous to or interchangeable with one another, unless otherwise specified or made clear from the context, and, therefore, are not described separately from one another, except to note differences or to emphasize certain features. For example, in the description that follows the aerostat 102 shall be understood to be analogous to or interchangeable with an aerostat 402, unless a contrary intent is expressed or clear from the context.

Figure 1B:
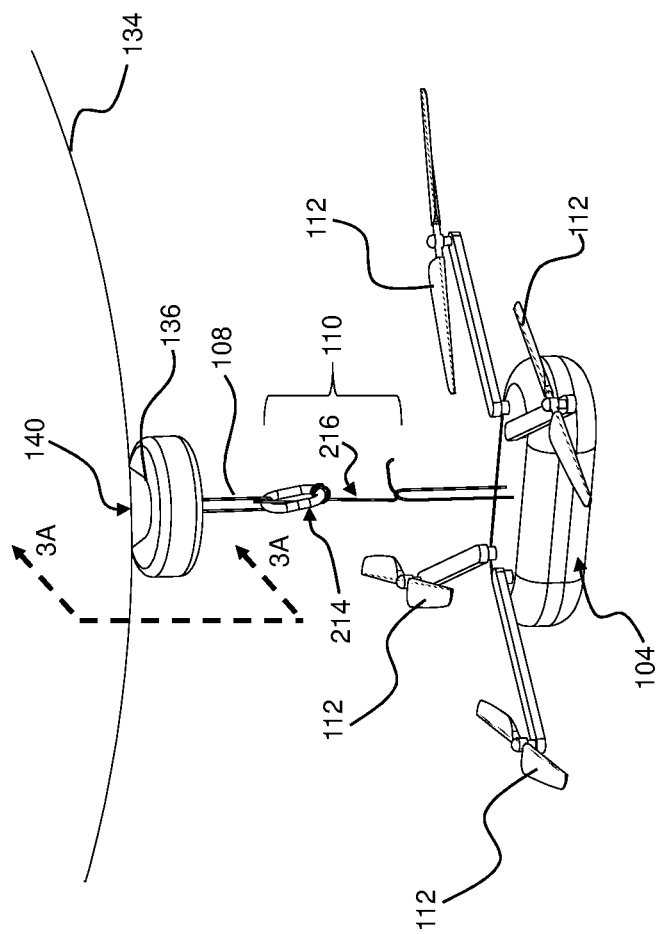
FIG. 1B is an enlarged view of the area of detail 1B of FIG. 1A, with the system of FIG. 1A shown the initial time step ($t=t_0$) in which the UAV is mechanically coupled to the aerostat.
Figure 1C:
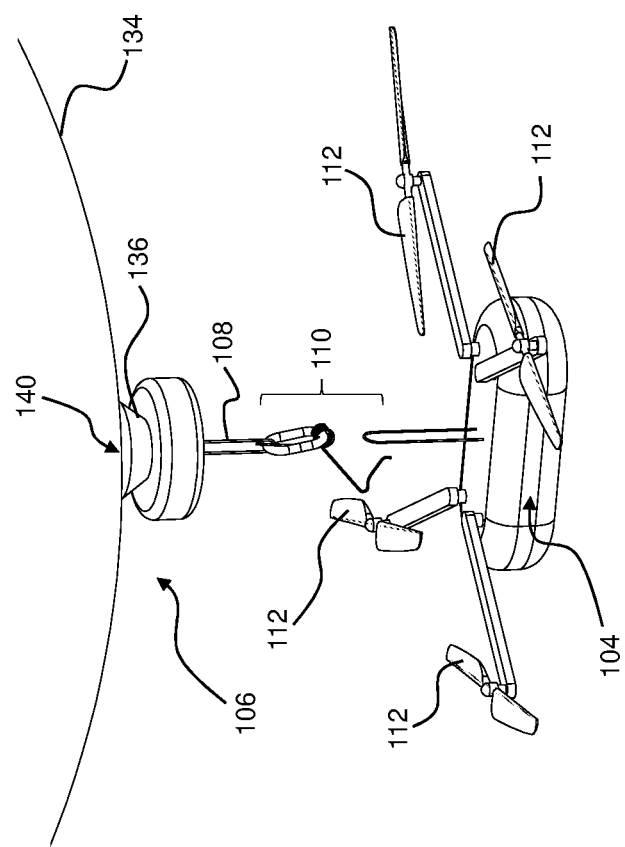
FIG. 1C is an enlarged view of the area if detail 1C of FIG. 1A, with the system of FIG. 1A shown at the first time step ($t=t_1$) in which the UAV is initially released from the aerostat.

Referring now to FIGS. 1A-1C, a system 100 for midair deployment of payload may include an aerostat 102 and an unmanned aerial vehicle 104 (hereinafter referred to as the UAV 104). The aerostat 102 may include an inflatable structure 106, a tether 108, and a trigger 110, with the inflatable structure 106 providing aerostatic lift to float the system 100 to altitude. The tether 108 may extend between the inflatable structure 106 and the trigger 110, and the tether 108 may mechanically couple the UAV 104 to the inflatable structure 106 such that the inflatable structure 106 may raise the UAV 104 to altitude through aerostatic lift provided by lifting gas in the inflatable structure 106. As described in greater detail below, the use of aerostatic lift of the inflatable structure 106 to raise the UAV 104 to altitude may preserve a significant amount of propulsion energy (e.g., battery capacity) that would otherwise be expended by the UAV 104 to create aerodynamic lift to reach altitude under otherwise identical environmental conditions. That is, by lifting the UAV 104 to altitude with little or no requirement of propulsion energy carried by the UAV 104, the system 100 may advantageously decouple certain aspects of performance of the UAV 104 from the size and weight of the UAV 104. For example, the system 100 may facilitate extending the range of the UAV 104 and/or facilitate forming the UAV 104 with a smaller form factor amenable to transport to and deployment from remote locations.

In use, as also described in greater detail below, the UAV 104 may be initially ($t=t_1$) mechanically coupled to the inflatable structure 106 via the tether 108. At a subsequent time-step ($t=t_1$), the trigger 110 may be actuatable to release the mechanical coupling of the tether 108 between the UAV 104 and the inflatable structure 106 in midair. Following release of the mechanical coupling between the UAV 104 and the inflatable structure 106 ($t=t_2$), the UAV 104 may separate from the aerostat 102. As wings 112 of the UAV move through the air, the UAV 104 may begin aerodynamic flight away from the aerostat 102 to carry out a mission while the aerostat 102 rises under aerostatic lift, as may be useful for using the aerostat 102 to carry out other mission aspects (e.g., communication, sensing, etc.) separate from those carried out by the UAV 104. As also described in greater detail below, the trigger 110 may be generally robust and reliable under a variety of conditions to facilitate accurate control over the release of the UAV 104 and the inflatable structure 106 and additionally, or alternatively, to reduce the likelihood of entanglement between the aerostat 102 and the UAV 104 as the UAV 104 transitions from being raised using aerostatic lift to moving through the air, away from the aerostat 102, using aerodynamic lift.

In general, the trigger 110 may be actuatable in response to any one or more of various different types of feedback suitable for facilitating proper release of the UAV 104 to carry out a mission. For example, the trigger 110 may be actuatable in response to an increase of a first lift of the UAV 104 relative to a second lift of the aerostat 102 while the aerostat 102 is in flight. This increase in the first lift relative to the second lift is generally indicative of initiation of aerodynamic flight of the UAV 104 and, thus, may serve as robust feedback for actuating the trigger 110 to reduce the likelihood of potential entanglement between the aerostat 102 and the UAV 104 as the UAV 104 begins aerodynamic flight.

In certain implementations, the trigger 110 may be self-actuatable to release the UAV 104 from the aerostat 102 as the first lift of the UAV 104 increases relative to the second lift of the aerostat 102. For example, the trigger 110 may be spring-biased to move away from the UAV 104 in response to a reduction in an external load on the trigger 110 as the first lift of the UAV 104 increases relative to the second lift of the aerostat 102 while the aerostat 102 is in flight. Advantageously, such spring-biased movement of the trigger 110 away from the UAV 104 may release the mechanical coupling between the UAV 104 and the inflatable structure 106 of the aerostat 102 while reducing the likelihood of entanglement between one or more portions of the trigger 110 and the UAV 104 as the UAV 104 separates from the aerostat 102 in midair.

Referring now to FIGS. 1A-1C and FIGS. 2A-2C, the trigger 110 may include a linkage 214, a spring 216, and a hook 218. The spring 216 may have a first section 221 and a second section 222. The spring 216 may be supported on the linkage 214 with the linkage 214 restricting movement of the first section 221 of the spring while the second section 222 of the spring 216 is resiliently flexible relative to the first section 221 of the spring 216. The hook 218 may be disposed along the second section 222 of the spring 216 such that, in use, an external load of the UAV 104 may be supported on the hook 218.

In some instances, the second section 222 of the spring 216 may be biased toward the first section 221 of the spring 216, and the second section 222 is movable toward the first section 221 as load is removed from the hook 218. For example, when the system 100 reaches a desired altitude (e.g., a predetermined altitude or an altitude associated with neutral buoyancy of the system 100), the UAV 104 may receive a command or be programmed to start up, causing the UAV 104 to rise under aerodynamic lift. As the UAV 104 rises, the external load of the UAV 104 is removed from the hook 218, the bias of the spring 216 may move the second section 222 of the spring 216—and, thus, the hook 218—away from the UAV 104 to reduce the likelihood of entanglement at the initial stages of release of the UAV 104 from the aerostat 102.

The spring 216 may generally be any one or more of various different types of springs movable away from the UAV 104 in response aerodynamic lift of the UAV 104 reducing an external load on the spring 216. Further, or instead, when tensioned under external load of the UAV 104, the spring 216 may support the UAV 104 stably on the hook 218. For example, the spring 216 may support the UAV 104 on the hook 218 under jostling as the system 100 ascends in conditions that may be windy but, nevertheless, amenable to aerodynamic flight of the UAV 104.

The spring 216 may be, as an example, a torsion spring such that the first section 221 of the spring 216 is a first leg of the torsion spring, the second section 222 of the spring 216 is a second leg of the torsion spring, and the spring 216 includes one or more coils 224 between the first section 221 and the second section 222 of the spring 216. Continuing with this example, the second section 222 of the spring 216 may be movable from a nonparallel position relative to the first section 221 to a substantially parallel position in response to placement of an external load associated with weight of the UAV 104 (e.g., at least 5 lbs. for many applications of the UAV 104) on the hook 218. It shall be generally understood that the first section 221 and the second section 222 are closer to ideal parallelism to one another in the substantially parallel position than in the non-parallel position. Further, or instead, in this context, the first section 221 and the second section 222 of the spring 216 may be understood to be substantially parallel to one another when an included angle between the first section 221 and the second section 222 of the spring 216 is 180 degrees ±15 degrees.

In some instances, the spring 216 may be a 0.556 inch outer diameter (OD) torsion spring with a 225 degree angle between the first section 221 and the second section 222 without an external load on the hook 218 and formed from 0.049 inch wire. Continuing with this example, the first section 221 of the spring 216 may have a length of about 2 inches, and the second section 222 of the spring 216 may have a length of about 1 inch. While this is useful in terms of using a stock torsion spring in instances in which the UAV 104 has a weight of about 6.6 lbs., the short length of the second section 222 may present challenges in excessively windy conditions. That is, as windy conditions cause fluctuations in the external load of the UAV 104 on the hook 218, the short length of the second section 222 may undergo large amounts of motion that, in turn, produce a large amount of swinging of the external load of the UAV 104 on the hook 218. Thus, in certain instances, the first section 221 and the second section 222 of the spring 216 may be of the same length (e.g., each may have a length of about 2 inches) to reduce the amount of swinging that the UAV 104 may experience while supported on the hook 218 under windy conditions.

In general, the hook 218 may have a shape that supports the UAV 104 under the force of gravity under windy conditions while being readily disengaged from the UAV 104 (e.g., as the UAV 104 begins to rise under aerodynamic lift) through deliberate movement of the hook 218 away from the UAV 104. Returning again to the example of the torsion spring described above, an arm portion 226 of the hook 218 extending from a curved portion 228 of the hook 218 may be short (e.g., about 0.1 inches) in many stock torsion springs. Thus, again, while this may be useful for using a stock torsion spring, the short length of the arm portion 226 of the hook 218 may allow the UAV 104 to prematurely disconnect from the trigger 110 as the second section 222 of the spring 216 and, thus, the hook 218 undergo movement associated with windy conditions. Accordingly, as compared to the arm portion 226 of the hook being short, a longer dimension of the arm portion 226 of the hook 218 may reduce the likelihood of unintended disengagement of the hook 218 from the UAV 104. As an upper boundary, the length of the arm portion 226 of the hook 218 may be limited by the ability to clear the UAV 104 without hitting the UAV 104 as the hook 218 moves away from the UAV 104 to release the UAV 104 from the aerostat 102.

In certain implementations, the hook 218 may include a wire, as may be useful for forming the hook 218 and the spring 216 as a unitary construction. To facilitate allowing the hook 218 to flex with a reduced likelihood of changing shape and/or breaking in response to changing load on the hook 218, the wire may have a cross-sectional area dimensioned to support a tensile load corresponding to stress in the wire being less than half of a yield strength of the wire. For example, the wire may have a circular cross-section and a diameter of 0.049 inches such that the wire has a cross-sectional area of $1.89 \times 10^{-3}$ in$^2$. Continuing with this example, the wire may be formed of high strength spring wire having a minimum tensile strength of 180,000 psi such that the wire may support a tensile load of about 170 lbs. or less. As may be appreciated from this example, while such wire may support a tensile load in excess of the weight of a single instance of the UAV 104, forming the hook 218 from such wire may be useful for supporting a plurality of instances of the UAV 104, as described in greater detail below.

In general, the linkage 214 of the trigger 110 may be mechanically coupled to the tether 108 and support the trigger 110. The external load of the UAV 104 on the trigger 110 may be transmitted to the tether 108, via the linkage 214, to pull the tether 108 taut as the system 100 moves in midair. Further, or instead, the linkage 214 may provide a counterforce to the spring 216 to facilitate movement of the spring 216 away from the UAV 104 to release the UAV 104 from the aerostat 102.

For example, continuing with the example of the spring 216 as a torsion spring, the linkage 214 may include a first portion 231 and a second portion 232 spaced apart from one another. The one or more coils 224 of the spring 216 may be wrapped about the first portion 231, and the second portion 232 of the linkage 214 may be between the first section 221 of the spring 216 and the second section 222 of the spring 216 such that the first section 221 rests against the second portion 232 of the linkage when a load (e.g., the load of the UAV 104) on the hook 218 moves the second section 222 of the spring 216 away from the first section 221 of the spring 216.

In certain implementations, the linkage 214 may be formed of one or more lightweight materials, as is generally useful for saving weight in the aerostat 102. Further, or instead, to the extent the linkage 214 may come into contact with the UAV 104 as the UAV 104 swings on the hook 218 and/or shortly following release of the UAV 104 from the aerostat 102, forming the linkage 214 using one or more lightweight materials (e.g., one or ore polymeric materials) may reduce the likelihood of damaging the UAV 104 through inadvertent contact with the linkage 214. Further, or instead, the linkage 214 may be a stock part such as a link of a chain and, more specifically, as a link of a plastic chain.

In general, the inflatable structure 106 may have an uninflated state and an inflated state, with the difference between the two states being whether the inflatable structure 106 contains a quantity of lifting gas that imparts at least some buoyancy (e.g., at least neutral buoyancy) to the aerostat 102 while the aerostat 102 is mechanically coupled to the UAV 104. For example, the inflatable structure 106 may include a balloon 134 and a neck 136. The balloon 134 may at least partially define a volume 138, and the neck 136 may define a passage 140 in fluid communication with the volume 138 such that the volume 138 may be filled with a lifting gas (such as a lifting gas formed from reaction of activated aluminum with water to form a lifting gas including steam and hydrogen) introduced into the volume 138, via the passage 140, to impart buoyancy to the aerostat 102 mechanically coupled to the UAV 104. By way of example, and not limitation, the inflatable structure 106 may include any one or more of the various different inflatable structures described in U.S. Pat. No. 11,130,557, issued to Alexander H. Slocum and Jonathan T. Slocum on Sep. 28, 2021, and entitled "CONTROLLING LIFTING GAS IN INFLATABLE STRUCTURES," and in U.S. Pat. No. 11,312,466, issued to Jonathan T. Slocum and Alexander T. Slocum on Apr. 26, 2022, and entitled "INFLATABLE STRUCTURE DEPLOYMENT," with the entire contents of each of these references hereby incorporated herein by reference.

Referring now to FIGS. 1A-1C, FIGS. 2A-2C, and FIGS. 3A and 3B, the aerostat 102 may include a drain valve 342 coupled to the inflatable structure 106. The drain valve 342 may be actuatable to release condensed moisture from the volume 138 of the balloon 134 via the passage 140 defined by the neck 136. Such actuation of the drain valve 342 may be particularly useful in implementations in which the lifting gas in the volume 138 of the balloon 134 includes steam, such as when the lifting gas is formed through reaction of activated aluminum with water to form lifting gas including steam and hydrogen. With increasing altitude and decreasing temperature as the aerostat 102 rises from the ground, steam in the lifting gas condenses to form condensate in the volume 138. As compared to steam, which provides lift, the condensate in the volume 138 does not provide lift and, thus, the weight of the condensate counteracts buoyancy forces provided by the hydrogen and any remaining steam in the lifting gas. Thus, the drain valve 342 may be selectively controllable to expel the condensate from the volume 138 to facilitate making efficient use of the buoyancy force provided by the lifting gas remaining in the volume 138. That is, draining at least a portion of the condensate from the volume 138, via the Thus, the aerostat 102 may additionally, or alternatively, include a drain valve 342 coupled to the inflatable structure 106 and disposed relative to the volume 138 to collect moisture condensed in the volume 138 from steam-containing lifting gas in the volume 138. As also described in greater detail below, the drain valve 342 may be controllable to expel the condensate 111 from the volume 138 to facilitate making efficient use of the buoyancy force provided by the lifting gas 109 remaining in the volume 138. That is, actuating the drain valve 342 to drain at least a portion of the condensate from the volume 138 of the balloon 134 via the passage 140 defined by the neck 136 may facilitate achieving higher altitudes of the aerostat 102, as compared to an otherwise identical aircraft under otherwise identical conditions.

In certain implementations, the drain valve 342 may be mechanically coupled to the inflatable structure 106. For example, the drain valve 342 may be supported along the passage 140 defined by the neck 136 of the inflatable structure 106. further or instead, the drain valve 342 may be coupled to the tether 108. With a payload (e.g., the UAV 104) supported on the hook 218 of the trigger 110, the drain valve 342 may provide a counter force to the payload on the hook 218 such that the tether 108 is pulled taut. This may be useful, for example, for maintaining a robust seal between the drain valve 342 and the neck 136, even as environmental conditions change. That is, the tension exerted on the drain valve 342 by the tether 108 may reduce the likelihood that lifting gas may inadvertently escape from the volume 138 by flowing around the drain valve 342.

In general, the drain valve 342 may be any one or more of various different types of drain valves that are selectively actuatable to release condensate from the volume 138 with little or no egress of lifting gas from the volume 138. For example, the drain valve 342 may be a float valve that is actuatable upon response to a predetermined level of condensate in the vicinity of the drain valve 342. Continuing with this example, actuation of the drain valve 342 may release a portion of the condensate from the inflatable structure 106 while maintaining a threshold amount of condensate in the inflatable structure 106 to act as a barrier to inadvertent egress of lifting gas from the volume 138 of the inflatable structure 106. Examples of the drain valve 342 include drain valves described in U.S. Pat. No. 11,130,557, issued to Alexander H. Slocum and Jonathan T. Slocum on Sep. 28, 2021, and entitled "CONTROLLING LIFTING GAS IN INFLATABLE STRUCTURES," the entire contents of which are hereby incorporated herein by reference.

Table 1 shows an example calculation used to determine lift capacity and altitude for release of the UAV 104. While the UAV 104 may be lifted to altitude using a balloon filled with helium or hydrogen, this would require large amounts of helium or hydrogen, which are then present in excess once the UAV 104 is released. Accordingly, the example analysis in Table 1 is based on reacting activated aluminum with water to form a lifting gas including steam and hydrogen and releasing condensate through the drain valve 342 as the condensate forms, thus facilitating efficient use of hydrogen to loft the UAV 104 and allowing the aerostat 102 to continue to rise to high altitude following release of the UAV 104, such that the aerostat 102 may act as a communication station, a relay station, and/or carry out other mission functions.

Table 1: Exemplary calculation to determine lift capacity and altitude for release of a UAV from an aerostat in midair.

| Parameter | Value | Units |
|---|---|---|
| Efficiency of reaction | 85% | |
| Mass of fuel | 1 | kg |
| Mass of water | 7 | kg |
| Mass of steam | 4.3 | kg |
| Volume of hydrogen | 1.0 | m^3 |
| Net lift potential of hydrogen | 1.1 | kg |
| Volume of steam | 7.2 | m^3 |
| Net Lift potential of steam | 3.7 | kg/sec |
| ratio of steam to hydroen lift poential | 3.3 | |
| Net lift potential (H2 + steam)/H2 | 4.3 | kg |
| ratio of total lift potential/H2 | 3.8 | |
| Balloon diameter | 2.5 | m |
| Surface area | 19.7 | m^2 |
| Cross section area (drag) | 4.9 | m^2 |
| Assume max upwards velocity | 1.8 | m/s |
| Convective heat transfer coefficient | 40 | W/m^2/C |
| Temperature air | 20 | C. |
| Heat of Vaporization | 2260 | KJ/kg |
| kg/sec steam condense | 0.007 | kg/sec |
| loss of lift per kg steam condensed | 0.012 | kg/sec |
| time for all steam to condense | 610 | seconds |
| Mass of balloon and lift elements | 0.6 | kg |
| Initial gross lift capacity | 9.0 | kg |
| Mass of primary and secondary payload | 2 | kg |
| Initial total system mass (Ballon, payload, steam) | 6.85 | kg |
| Net initial lift to accelerate the balloon upward | 21.3 | N |
| drag coefficient | 1 | |
| density air at 20 C. | 1.1 | kg/m^3 |
| integration time increment | 0.2 | sec |
| maximum velocity | 2.8 | m/s |
| Maximum height | 742 | m |
| Time to maximum height | 369 | sec |
| Mass of balloon and payload | 2.6 | kg |
| Mass of aluminum fuel needed to generate just hydrogen for the lift | 2.3 | kg |
| Mass of water required | 16.2 | kg |
| Mass of pure H2 lift system/Mass steam and H2 system | 2.3 | |

Table 1 shows typical values and formulas used for a time step numerical integration to account for the continual condensation of steam from lifting gas in the volume 138 of the inflatable structure 106, and subsequent loss of lift of the aerostat 102, while assuming the condensed water is drained. It shall be appreciated that this calculation is an approximation, and a more exact analysis would include the convective heat transfer coefficient as a function of upward air speed, air temperature, and heat conduction within the inflatable structure 106. For the scenario examined in Table 1, an equilibrium point corresponding to neutral buoyancy is expected to be reached at about ¾ km meters in instances in which the UAV 104 and other payload carried by the aerostat 102 (referred to as primary and secondary payload in Table 1) have a combined mass of 2 kg.

For the scenario shown in Table 1, if pure hydrogen were used as the lifting gas to provide lift to raise the primary and secondary payload (2 kg) and the aerostat 102 (referred to as the balloon system in Table 1 and having a mass of 0.6 kg), 2.3 kg of activated aluminum (also referred to herein as aluminum fuel) would be required to be reacted with water to produce the required amount of hydrogen. In addition to the 2.3 kg of activated aluminum, a significant amount of water is needed (16.2 kg), further adding to logistical challenges associated with using only hydrogen as a lifting gas. By comparison, reacting activated aluminum with water to form a lifting gas that includes both hydrogen and steam requires a combined weight of water and activated aluminum of only about 10 kg, which means that a single person could transport two systems in a backpack, verses one pure hydrogen system. This means that it would cost about twice as much to launch the system 100 if activated aluminum is reacted with water to form hydrogen and steam, and only the hydrogen is used as the lifting gas. Also important is the weight of the system to be transported by personnel, such as to a remote location.

Table 2 shows a calculation of how the system 100 may be used to save propulsion energy (assumed to be battery energy in this calculation) of the UAV 104 by using lifting gas in the aerostat 102 to lift the UAV 104 to altitude and then release the UAV 104 at altitude according to the various different techniques described herein. For the implementation of the UAV 104 used for the calculation in Table 2, about ¾ of the available propulsion energy (e.g., battery energy) of the UAV 104 would be required to raise the UAV 104 to ¾ km. Stated differently, in the scenario shown in Table 2, raising the UAV 104 to ¾ km using the aerostat 102 according to the techniques described herein may increase the cruising time of the UAV 104 by about a factor of four as compared to launching the UAV 104 from the ground. It will be appreciated that heat transfer coefficients are important limiting factors and, thus, the use of heat reflective coatings on the inflatable structure 106 may be used to reduce the rate of steam condensation. Being able to raise a UAV 104 to even only a few km and then release it would satisfy many mission needs, and in instances in which the UAV 104 has glide capabilities, from that altitude the UAV 104 may ride thermal currents to much higher altitudes.

Table 2: Example calculation of battery energy savings for a UAV that is lifted to altitude by an aerostat before the UAV is released to fly at altitude.

| Drone weight | |
|---|---|
| | 61 ounces |
| | 1731 grams |
| Battery weight | |
| | 45 ounces |
| | 1287 grams |

| | Energy | |
|---|---|---|
| | 2100 | mAh |
| | 3.8 | volts |
| | 28,728 | Joules |
| Lift altitude | 750 | m |
| Ideal energy to lift | 12,722 | Joules |
| efficiency of electric motor and propellor lift | 60% | |
| Battery energy required | 21,203 | Joules |
| % of battery energy to lift to altitude | 74% | |

Having described various aspects of the mechanically coupling the aerostat 102 and the UAV 104 to one another and releasing this coupling at altitude to facilitate, among other things, extending the range and availability of the UAV 104 for missions, attention is now directed to various aspects of controlling the release of the UAV 104 from the aerostat 102 and operating the aerostat 102 following release of the UAV 104.

In certain implementations, the aerostat 102 may include a controller 344. The controller 344 may be supported, for example, along the neck 136 of the inflatable structure 106, such as may be useful for providing ballast to the aerostat 102 and/or for achieving an efficient form factor of the aerostat 102. While these advantages may be significant in some instances, it shall be appreciated that the controller 344 may be additionally or alternatively disposed along any portion of the aerostat 102 without departing from the scope of the present disclosure.

The controller 344 may generally include a processing unit 346 and one or more non-transitory computer storage media 348 in electrical communication with one another. The one or more non-transitory computer storage media 348 may have stored thereon instructions that, when executed by the processing unit 346, cause the processing unit 346 to carry out any one or more of the various different techniques associated with controlling separation of the UAV 104 from the aerostat 102, as described in greater detail below, and/or for operating the aerostat 102 as a communication station, a relay station, and/or to provide other functionality following release of the UAV 104 from the aerostat 102.

In certain implementations, the aerostat 102 may include a payload, such as a communication payload 350 in electrical communication with the controller 344. The electrical communication between the communication payload 350 and the controller 344 may be wired, wireless, or a combination thereof. The communication payload 350 may be, for example, supported on the aerostat 102 in proximity to the controller 344. Thus, returning to the example above, the controller 344 may be supported along the neck 136 of the inflatable structure 106. More generally, however, it shall be appreciated that any one or more portions of the communication payload 350 may be supported along any one or more other portions of the aerostat 102.

In general, the communication payload 350 may include any one or more different types of modules as may be necessary or useful for accurately and reliably releasing the UAV 104 from the aerostat 102 according to one or more of various different parameters, including parameters associated with the environment, mission timing/duration, flight performance of the system 100 with the aerostat 102 and the UAV 104 mechanically coupled to one another, and/or flight performance of the aerostat 102 before, during, or after release of the UAV 104 in midair.

As an example, the communication payload 350 may include a transceiver module 352. The transceiver module 352 may send and receive information from the aerostat 102 to a resource on the ground and/or to other resources in the air. The controller 344 may control the transceiver module 352 to send and/or receive communications before, during, and/or after release of the UAV 104 from the aerostat 102. As an example, the transceiver module 352 may receive a communication signal from an external resource (e.g., a resource on the ground) to actuate the trigger 110 to release the UAV 104 from the aerostat 102. Further, or instead, the transceiver module 352 may send a communication signal to the UAV 104 to power up such that the UAV 104 may generate aerodynamic lift to lift the UAV 104 relative to the aerostat 102 to move the trigger 110 away from the UAV 104 and release the UAV 104 according to any one or more of the various different techniques described herein. Additionally, or alternatively, the transceiver module 352 may communicate with the UAV 104 following release of the UAV 104 from the aerostat 102. Such communication following release of the UAV 104 from the aerostat 102 may be useful for collecting data from the UAV 104 as the UAV 104 carries out a mission. Additionally, or alternatively, communication following release of the UAV 104 from the aerostat 102 may be useful for adjusting one or more operating parameters of the UAV 104 based at least in part on one or more parameters sensed by the aerostat 102.

Additionally, or alternatively, the communication payload 350 may include a sensor module 354. The sensor module 354 may include any one or more of various different types of sensors useful for controlling release of the UAV 104 from the aerostat 102 according to the various different techniques described herein and/or any one or more of various different types of sensors useful gathering environmental information using the aerostat 102, such as may be useful following release of the UAV 104 from the aerostat 102. Thus, by way of example and not limitation, the sensor module 354 may include one or more of an altimeter, a clock, a timer, a temperature sensor, and/or a pressure sensor.

While systems have been described as including a self-actuatable trigger—responsive to a change in load on the trigger—to release a UAV from an aerostat, it shall be appreciated that additional or alternative types of triggers may be useful for releasing a UAV from an aerostat.

For example, referring now to FIGS. 3A and 3B and FIGS. 4A and 4B, a system 400 may include an aerostat 402, a UAV 404, a tether 408, and a trigger 410. The aerostat 402 may include the controller 344 and the communication payload 350. The trigger 410 may include an actuator 460 and a power source 462 in electrical communication with one another and, optionally, with the controller 344. The actuator 460 and the power source 462 may be supported, for example, on the UAV 404, as may be convenient for separating the tether 408 from the UAV 404 with little or no extra material of the tether 408 remaining on the UAV 404 following release of the UAV 404. While this may be advantageous in certain instances, it shall be appreciated that one or both of the actuator 460 or the power source 462 may be supported along the aerostat 402 in some instances, such as along the tether 408 itself.

The actuator 460 may be electrically actuatable by the power source 462 to release the UAV 404 from the aerostat 402 (e.g., from an inflatable structure 406 of the aerostat 402) in midair. For example, the sensor module 354 of the communication payload 350 may include an altimeter, and the communication payload 350 may send a feedback signal from the altimeter (the feedback signal indicative of altitude of the system 400), and the controller 344 may activate the power source 462 to actuate the actuator 460, with actuation of the actuator severing the tether 408 or otherwise releasing mechanical coupling of the aerostat 402 and the UAV 404 via the tether 408.

As an example, the actuator 460 may include a heater 463 (e.g., an electrical resistance heater) electrically actuatable by the power source 462 to heat the tether 408. For example, the heater 463 may heat the tether 408 to yield under load of the UAV 404 to release the UAV 404 from the aerostat 402 (e.g., from the inflatable structure 406) in midair. For example, at least a portion of the tether 408 may be fuse wire, and small bursts of electrical energy from the power source 462 to the heater 463 may cause the fuse wire to lose strength (such as by melting or becoming soft) to release the UAV 404. Additionally, or alternatively, the tether 408 may be monofilament fishing line. Further, or instead, the tether 408 may include one or more thinned sections that preferentially weaken through the application of heat from the heater 463. As the UAV 404 is released in this way, the UAV 404 may fall free of the aerostat 402, and wings 412 of the UAV 404 may begin to rotate (in instances in which the wings 412 of the UAV 404 are rotors) such that the UAV 404 may fly along a path away from the aerostat 402.

Figure 5:
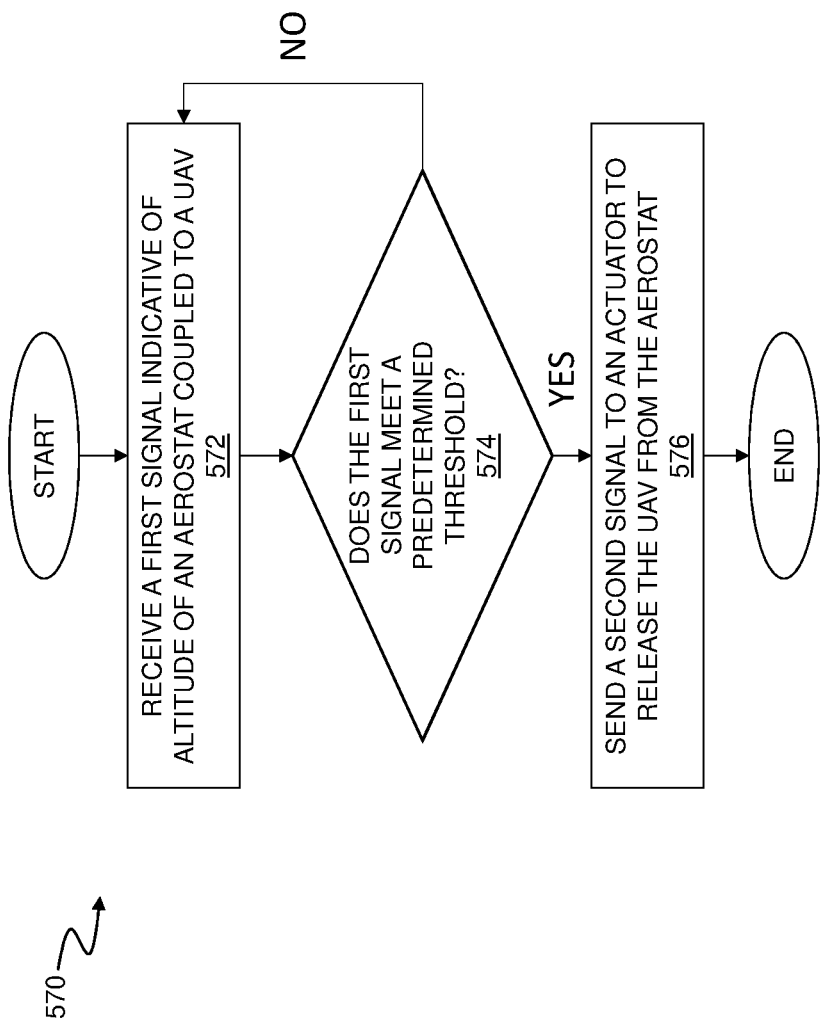
FIG. 5 is a flow chart of an exemplary method of operation of a system for midair deployment of payload.

FIG. 5 is a flow chart of an exemplary method 570 of operation of a system for midair deployment of payload. Unless otherwise specified or made clear from the context, it shall be understood that any one or more of various different aspects of the exemplary method 570 may be carried out by the controller 344 (FIG. 3B) in electrical communication with at least the sensor module 354 (FIG. 3B) of the communication payload 350 (FIG. 3B). For example, the one or more non-transitory computer storage media 348 (FIG. 3B) may have stored thereon instructions for causing the processing unit 346 (FIG. 3B) to carry out one or more aspects of the exemplary method 570.

As shown in step 572, the exemplary method 570 may include receiving, from an altimeter, a first signal indicative of altitude of an inflatable structure of an aerostat coupled to a UAV. The first signal indicative of altitude may, for example, be a continuous indication of altitude of the inflatable structure lifting the aerostat. The altitude may be an absolute parameter relative to sea level, for example. Further, or instead, the altitude may be relative to a ground surface immediately below the aerostat.

As shown in step 574, the exemplary method 570 may include comparing the first signal indicative of altitude to a predetermined threshold parameter. The predetermined threshold parameter may be, for example, a predetermined altitude. The predetermined altitude may be, for example, a minimum altitude below which it may not be safe or prudent to release the UAV from the aerostat. Further, or instead, the predetermined threshold parameter may include a change in altitude indicative of neutral buoyancy of the inflatable structure attached to the at least one UAV.

As shown in step 576, the exemplary method 570 may include, based on comparison of the first signal to the predetermined threshold, sending a second signal to an actuator to release the at least one UAV from the inflatable structure in midair. The actuator may be any one or more of the various different types of electrically activated actuators and, thus, may include a heater (e.g., the heater 463). Further, or instead, as described below, the actuator may include a solenoid operable to sever a tether to release the UAV from the inflatable structure in midair.

While the exemplary method 570 has been described as being carried out based on altitude, it shall be appreciated that any one or more other parameters may additionally or alternatively be used as the first signal. For example, the first signal may be indicative of a duration of time following launch of the aerostat coupled to the UAV, and the UAV may be released from the aerostat once the measured duration of time equals or surpasses a predetermined duration.

While systems have been described as including a trigger having an actuator that includes heater actuatable to release a UAV from an aerostat, it shall be appreciated that other types of actuation may additionally or alternatively be used to release a UAV from an aerostat.

Figure 3A:
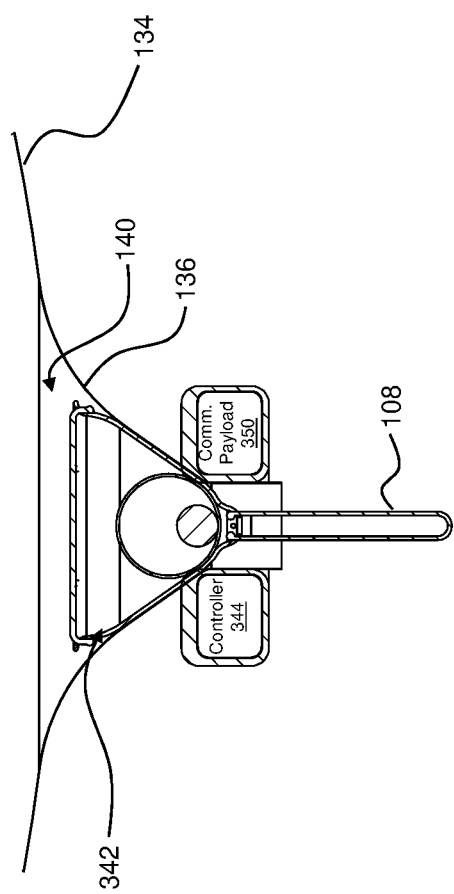
FIG. 3A is a schematic representation of a partial cross-section of an inflatable structure and tether of the aerostat of FIG. 1A, with the partial cross-section taken along line 3A-3A in FIG. 1B.
Figure 3B:
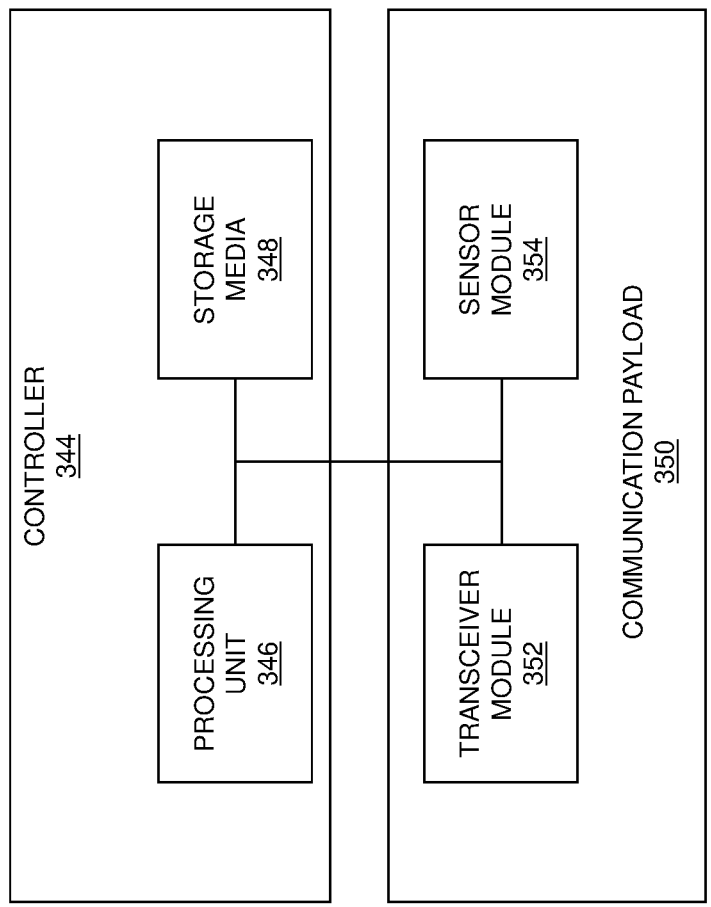
FIG. 3B is a schematic representation of a controller and a communication payload of the aerostat of FIG. 1A.
Figure 4B:
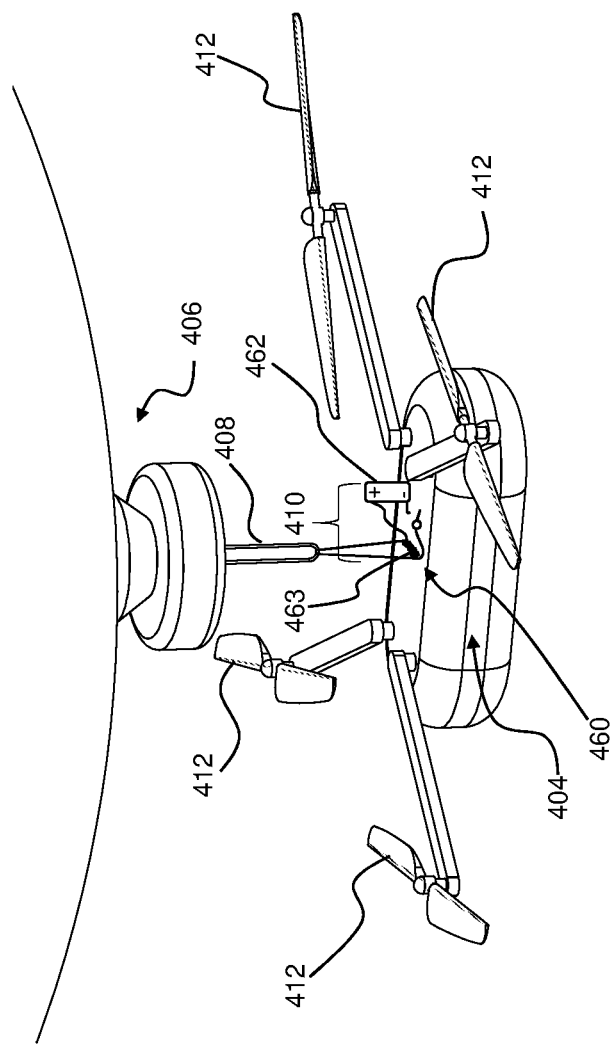
FIG. 4B is an enlarged view along the area of detail 4B in FIG. 4A.
Figure 6:
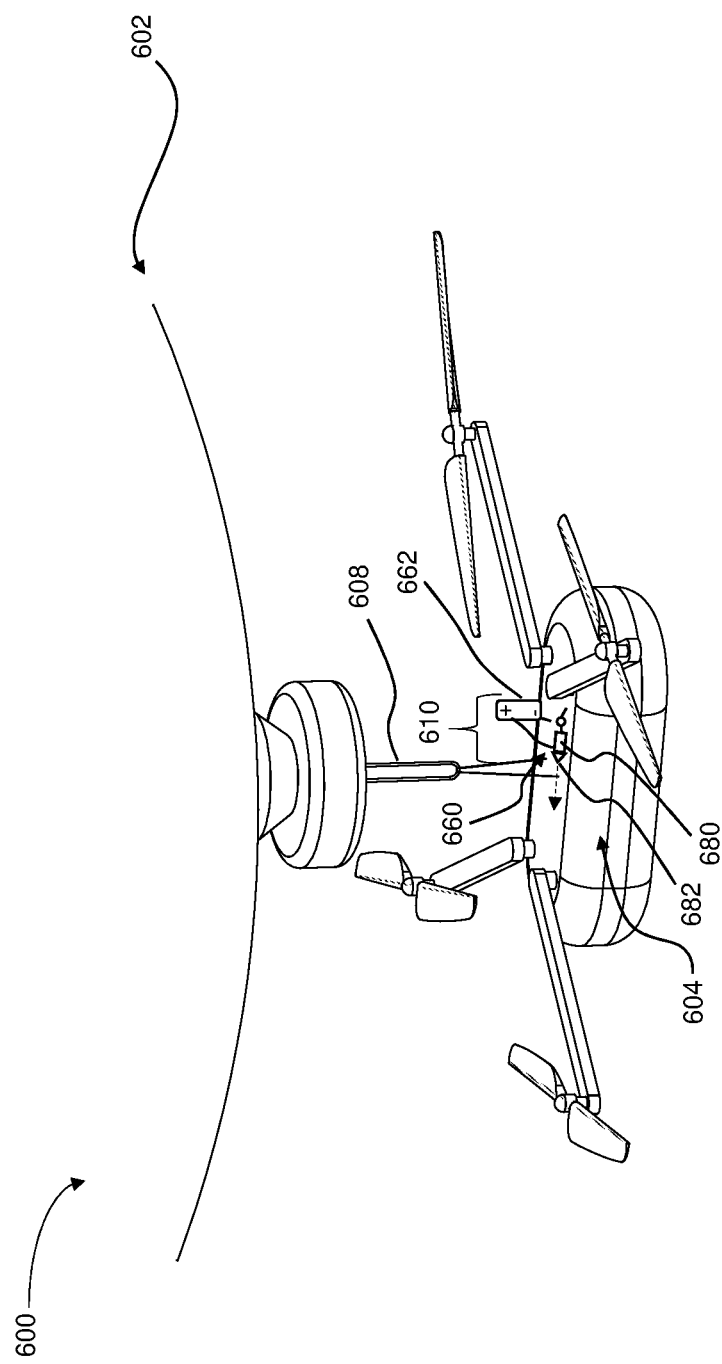
FIG. 6 is a schematic representation of a system for midair deployment of payload, the system including a trigger including a solenoid.

Referring now to FIGS. 3A and 3B and FIG. 6, a system 600 may include an aerostat 602, a UAV 604, a tether 608, and a trigger 610. The aerostat 602 may include the controller 344 and the communication payload 350. The trigger 620 may include an actuator 660 and a power source 662 in electrical communication with one another and, optionally, with the controller 344. The actuator 660 and the power source 662 may be supported, for example, on the UAV 604, as may be convenient for separating the tether 608 from the UAV 604 with little or no extra material of the tether 408 remaining on the UAV 604 following release of the UAV 604 to reduce the likelihood of entanglement of portions of the tether 608 with the UAV 604 following release of the UAV 604 from the aerostat 602. While this may be advantageous in certain instances, it shall be appreciated that one or both of the actuator 460 or the power source 462 may be supported along the aerostat 402 in some instances, such as along the tether 408 itself.

The actuator 660 may include a solenoid 680 electrically actuatable by the power source 462 to sever the tether 408. For example, the solenoid 680 may be coupled to a cutting element 682, and actuation of the solenoid 680 may move the cutting element 682 into contact with the tether 608 to sever the tether 608, thus releasing the UAV 604 from the aerostat 602.

While systems have been described in the context of releasing a single UAV, it shall be appreciated that this has been done for the sake of clear and efficient explanation. Unless otherwise specified, any one or more of the various different devices, systems, and methods described herein may be carried out to release a plurality of UAVs from an aerostat.

Figure 7:
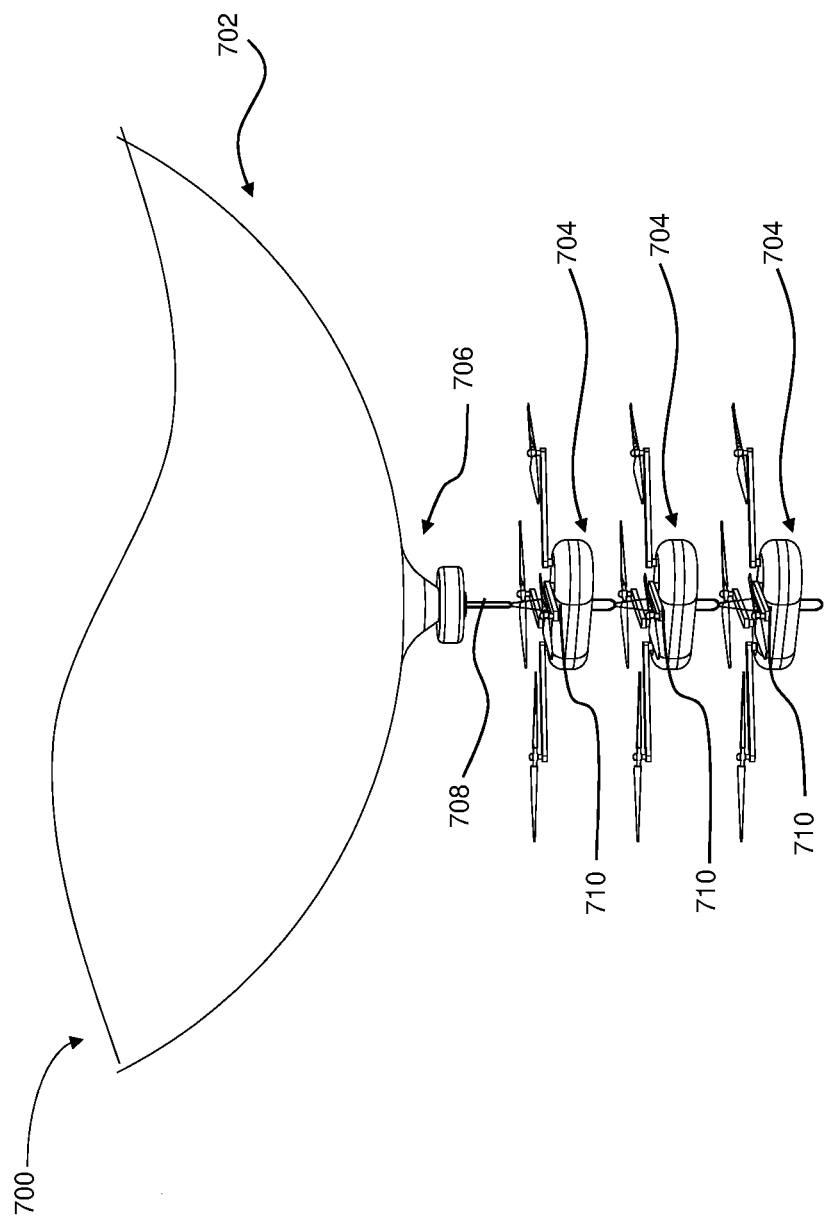
FIG. 7 is a schematic representation of a system for midair deployment of payload, the system including a plurality of UAVs coupled to an aerostat.

For example, referring now to FIG. 7, a system 700 may include a plurality of UAVs 704 mechanically coupled to an inflatable structure 706 of an aerostat 702 via one or more instances of a tether 708. The one or more instances of the tether 708 may, for example, extend between the plurality of UAVs 704 to couple the plurality of UAVs to one another and to the inflatable structure 706.

A trigger 710 may be actuatable to release each one of the plurality of UAVs 704 independently of one another by independently severing the one or more instances of the tether 708. For example, in instances in which the trigger 710 is self-actuatable using a biased spring as described herein, each one of the plurality of UAVs 704 may be individually powered to lift from the trigger 710, thus releasing the plurality of UAVs 704 independently of one another. Further, or instead, in instances in which the trigger 710 includes a heater as described herein, one or more portions of the heater may be separately actuated to sever one or more portions of the tether 708 to release the plurality of UAVs 704 independently of one another.

While the plurality of UAVs 704 may be independently releasable from the aerostat 702 in any order, it shall be appreciated that the plurality of UAVs 704 may be releasable from the aerostat 702 in a specific order to reduce the likelihood of entanglement as each one of the plurality of UAVs 704 is released from the aerostat. For example, the one or more instances of the tether 708 may extend between the plurality of UAVs 704 and the inflatable structure 706 such that the plurality of UAVs 704 are arranged in series in a direction extending below and away from the inflatable structure 706 while the inflatable structure 706 is in midair. Continuing with this example, the plurality of UAVs 704 may be released in order of decreasing distance away from the inflatable structure 706 while the inflatable structure 706 is in midair. This ordered release of the plurality of UAVs 704 may be useful for, among other things, reducing the likelihood of entanglement of the plurality of UAVs 704 with one another and/or with the aerostat 702.

While UAVs have been described herein as including rotary wings or blades (also referred to herein as rotors), it shall be appreciated that any one or more of the various different devices, systems, and methods described herein may be used with fixed-wing UAVs, unless otherwise indicated or made clear from the context.

Figure 8:
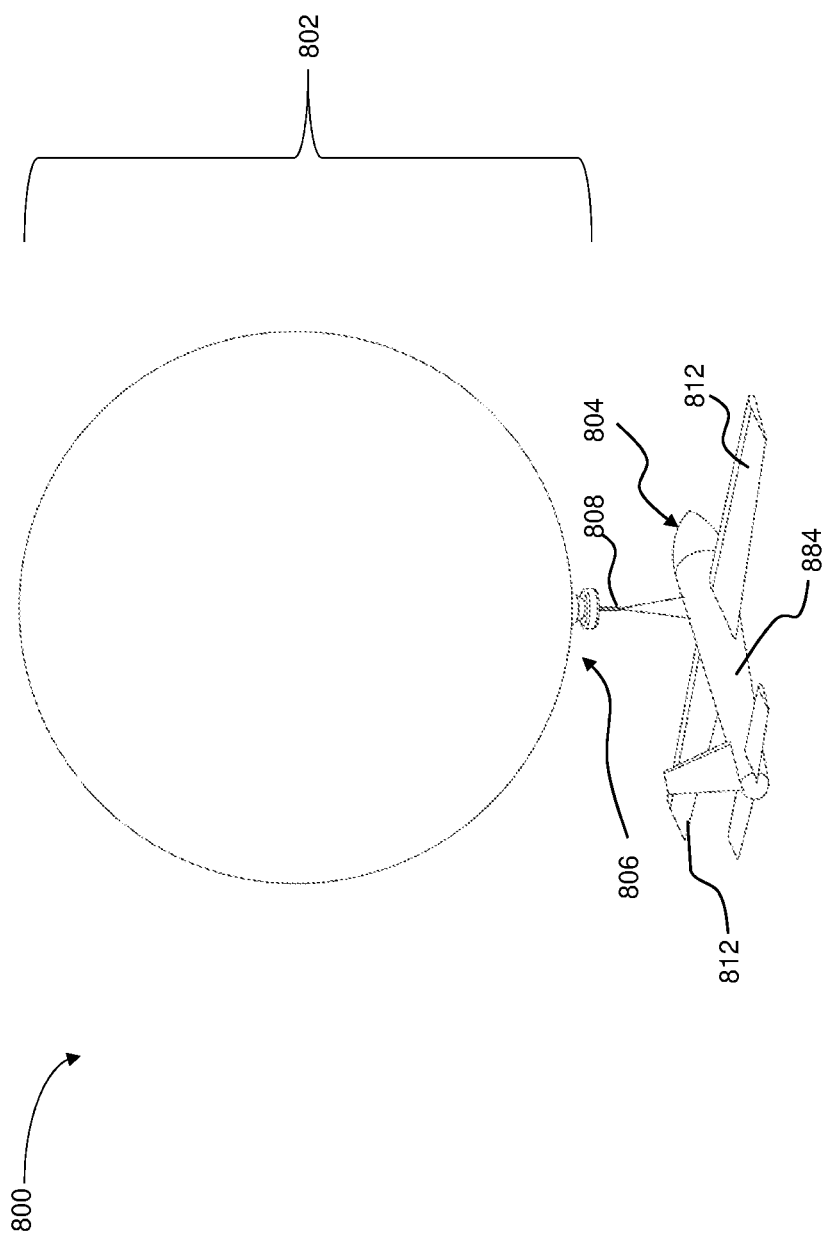
FIG. 8 is a schematic representation of a system for midair deployment of payload, the system including a fixed wing UAV coupled to an aerostat.

For example, referring now to FIG. 8, a system 800 may include a UAV 804 mechanically coupled to an inflatable structure 806 of an aerostat 802 via a tether 808. The UAV 804 may include wings 812 fixed to a body 884 of the UAV 804 such that the UAV 804 is a fixed-wing aircraft. The UAV 804 may include a propulsion system in some instances such that the UAV 804 is self-propelled, which shall be understood to include intermittent use of the propulsion system and gliding. Additionally, or alternatively the UAV 804 may be a glider with no propulsion system, such as may be useful for atmospheric observation, among other applications. To the extent the UAV 804 is intended to carry out a mission that includes gliding for all or a portion of flight, the system 800 may release the UAV 804 at a high altitude (e.g., on the order of 1-10 km above sea level) such that the UAV may ride thermal currents that may advantageously extend the range of the UAV 804.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. An aerostat for midair deployment of payload, the aerostat comprising:
    an inflatable structure;
    a tether coupled to the inflatable structure; and
    a trigger including a linkage, a spring, and a hook, the linkage coupled to the inflatable structure via the tether, the spring having a first section and a second section, the linkage restricting movement of the first section of the spring, the second section of the spring resiliently flexible relative to the first section of the spring, and the hook disposed along the second section of the spring, wherein the spring is a torsion spring, the first section of the spring is a first leg of the torsion spring, the second section of the spring is a second leg of the torsion spring, and the torsion spring includes one or more coils between the first leg and the second leg, the linkage includes a first portion and a second portion, the first portion spaced apart from the second portion, the one or more coils of the torsion spring are wrapped about the first portion of the linkage, the second portion of the linkage is between the first leg and the second leg, and the first leg rests against the second portion of the linkage when a load on the hook moves the second leg away from the first leg.

2. The aerostat of claim 1, wherein the second section of the spring is biased toward the first section of the spring, and the second section movable toward the first section as the load is removed from the hook.

3. The aerostat of claim 1, wherein the hook includes a wire having a cross-sectional area dimensioned to support a tensile load corresponding to stress in the wire less than half of a yield strength of the wire.

4. The aerostat of claim 1, wherein the second leg is movable from a nonparallel position relative to the first leg to a substantially parallel position relative to the first leg in response to placement of an external load of at least 5 lbs. on the hook.

5. The aerostat of claim 1, wherein the linkage is formed of one or more polymeric materials.

6. The aerostat of claim 1, wherein the second section of the spring is biased to flex in a direction toward the inflatable structure.

7. The aerostat of claim 1, wherein the first section of the spring is at least as long as the second section of the spring.

8. An aerostat for midair deployment of payload, the aerostat comprising:
   an inflatable structure;
   a tether coupled to the inflatable structure; and
   a trigger including a linkage, a spring, and a hook, the linkage coupled to the inflatable structure via the tether, the spring having a first section and a second section, the linkage disposed between the first section and the second section of the spring, the second section of the spring rotationally biased toward the first section of the spring, the hook supported on the second section of the spring, and the linkage restricting movement of the first section of the spring toward the second section of the spring in response to a load supported on the hook.

9. The aerostat of claim 8, wherein the spring includes one or more coils between the first section and the second section of the spring, and the one or more coils are wrapped about the linkage.

10. The aerostat of claim 8, wherein the second section of the spring is rotational from a nonparallel position relative to the first section of the spring to a parallel position relative to the first section of the spring in response to the load on the hook.

11. The aerostat of claim 8, wherein an included angle between the first section of the spring and the second section of the spring is greater than 90 degrees without the load on the hook.

12. The aerostat of claim 8, wherein the first section of the spring is longer than the second section of the spring.

13. The aerostat of claim 12, wherein the first section of the spring is twice as long as the second section of the spring.

14. The aerostat of claim 8, wherein the spring is formed of a wire having a tensile strength of at least 180,000 psi.

15. The aerostat of claim 8, wherein the linkage is formed of one or more polymeric materials.

16. The aerostat of claim 8, wherein the linkage defines an opening, and the first section of the spring extends through the opening.

17. The aerostat of claim 16, wherein the linkage is a chain link.

* * * * *